United States Patent
Alvarez et al.

(10) Patent No.: US 7,126,528 B2
(45) Date of Patent: Oct. 24, 2006

(54) METHOD FOR DELIVERING SECONDARY (NON-LOCATION) DATA TO A GPS RECEIVER

(75) Inventors: Jennifer L. Alvarez, San Antonio, TX (US); Roger R. Chiodo, San Antonio, TX (US); Thomas H. Jaeckle, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 0 days.

(21) Appl. No.: 10/789,757

(22) Filed: Feb. 27, 2004

(65) Prior Publication Data

US 2004/0201521 A1    Oct. 14, 2004

Related U.S. Application Data

(60) Provisional application No. 60/451,144, filed on Feb. 28, 2003.

(51) Int. Cl.
*G01S 1/00* (2006.01)
(52) U.S. Cl. .................................. 342/357.06
(58) Field of Classification Search ........... 342/357.06, 342/357.09, 357.1, 357.12; 701/213, 215
See application file for complete search history.

(56) References Cited

U.S. PATENT DOCUMENTS

| | | | |
|---|---|---|---|
| 6,173,005 B1 * | 1/2001 | Kotzin et al. | 375/141 |
| 6,417,800 B1 | 7/2002 | Valio et al. | 342/357.02 |
| 6,476,762 B1 | 11/2002 | Valio et al. | 342/357.02 |
| 6,583,756 B1 | 6/2003 | Sheynblat | 342/357.02 |
| 6,603,966 B1 | 8/2003 | Sheffield | 455/423 |
| 6,603,977 B1 | 8/2003 | Walsh et al. | 455/456 |
| 6,611,756 B1 | 8/2003 | Chen et al. | 701/213 |
| 6,625,458 B1 | 9/2003 | Pihl et al. | 455/456.1 |
| 6,697,622 B1 * | 2/2004 | Ishikawa et al. | 455/434 |
| 6,888,880 B1 * | 5/2005 | Lee et al. | 375/149 |
| 2002/0167918 A1 | 11/2002 | Brewer | 370/324 |

* cited by examiner

*Primary Examiner*—Dao Phan
(74) *Attorney, Agent, or Firm*—Baker Botts, L.L.P.

(57) ABSTRACT

A method of using a GPS receiver to receive secondary data. A conventional GPS receiver is modified to receive such data, without modifying its hardware. The secondary data is carried in a signal that has the same characteristics as a conventional GPS navigation signal, but is delivered at a specified frequency and time and with a specified and "unused" spreading code. The secondary data is contained in a data subframe that is sufficiently similar to subframes that carry GPS navigation data, such that it can be demodulated and accessed by the GPS receiver.

20 Claims, 2 Drawing Sheets

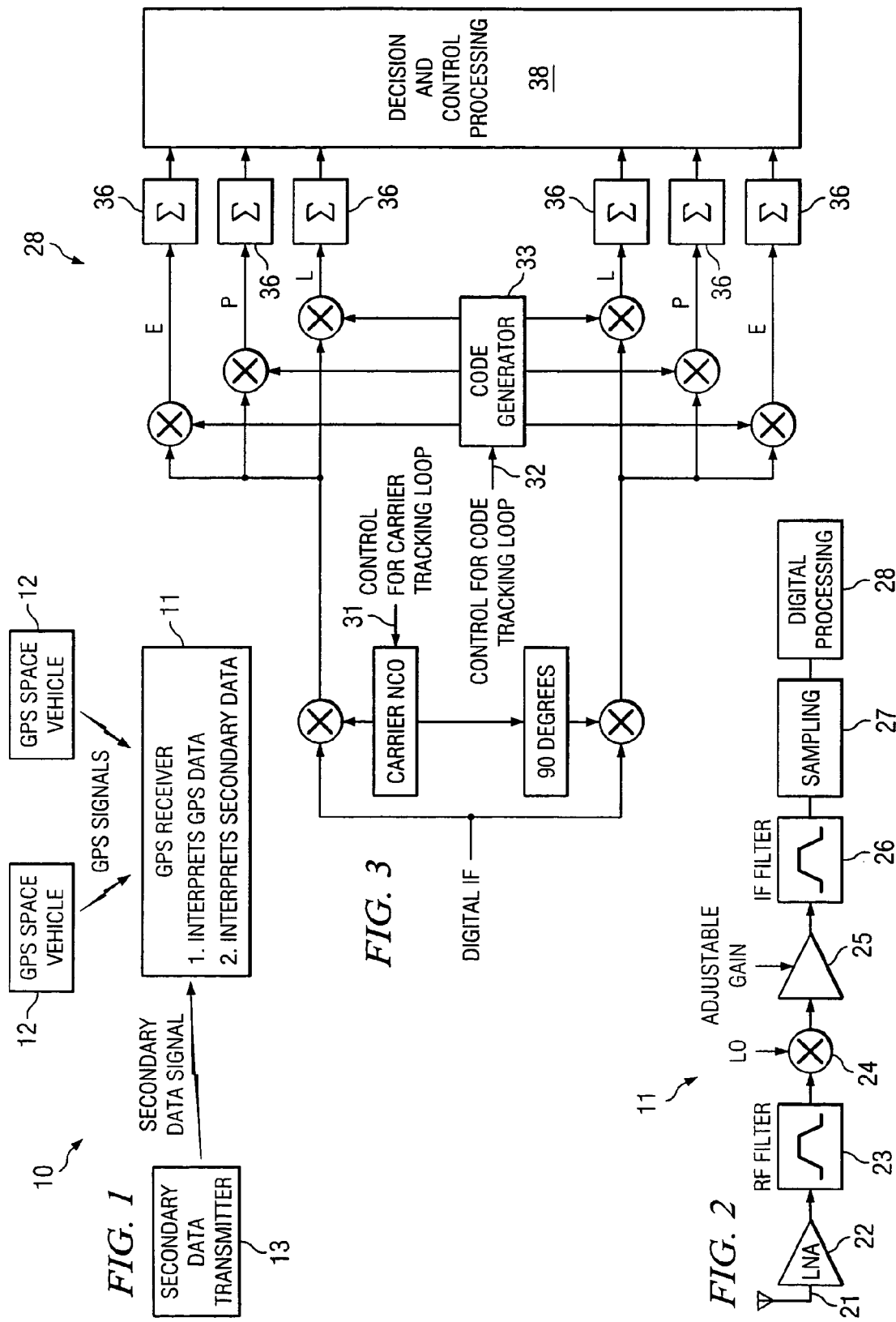

FIG. 4

| WORD | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|
| 1 | PREAMBLE | | | | | | | | TLM MSG | | | | | | | | | | | | | | R | R | PARITY | | | | | |
|   | 1 | 0 | 0 | 0 | 1 | 0 | 1 | 1 | 0 | 0 | 0 | 0 | 0 | 0 | 1 | 0 | 0 | 1 | 0 | 0 | 0 | 0 | 0 | 0 | 1 | 1 | 1 | 1 | 1 | 1 |
| 2 | TOW TRUNCATED | | | | | | | | | | | | | | | | AI | AS | SFID | | | | P | P | PARITY | | | | | |
|   | 1 | 0 | 0 | 0 | 1 | 0 | 1 | 0 | 0 | 1 | 0 | 1 | 1 | 0 | 0 | 0 | 1 | 0 | 1 | 0 | 0 | 1 | 0 | 1 | 0 | 1 | 1 | 0 | 0 | 0 |
| 3 | GPS WEEK | | | | | | | | | | L2 | | | URA | | | SV HEALTH | | | | | | IODC | | PARITY | | | | | |
|   | 1 | 0 | 0 | 0 | 1 | 1 | 1 | 0 | 0 | 1 | 0 | 1 | 0 | 1 | 0 | 1 | 0 | 1 | 1 | 1 | 1 | 1 | 0 | 1 | 0 | 1 | 1 | 1 | 0 | 0 |
| 4 | P L2 | | | | | | | | | SECONDARY DATA | | | | | | | | | | | | | P ALIGN | | PARITY | | | | | |
|   | 1 | 0 | 0 | 0 | 1 | 1 | 1 | 0 | 0 | 1 | 0 | 1 | 0 | 1 | 0 | 1 | 1 | 1 | 1 | 1 | 1 | 1 | 0 | 1 | 1 | 0 | 1 | 1 | 0 | 0 |
| 5 | RESERVED | | | | | | | | | SECONDARY DATA | | | | | | | | | | | | | P ALIGN | | PARITY | | | | | |
|   | 1 | 0 | 0 | 0 | 1 | 1 | 1 | 0 | 0 | 1 | 0 | 1 | 0 | 1 | 0 | 1 | 1 | 1 | 1 | 1 | 1 | 1 | 0 | 1 | 1 | 0 | 1 | 1 | 0 | 0 |
| 6 | RESERVED | | | | | | | | | SECONDARY DATA | | | | | | | | | | | | | P ALIGN | | PARITY | | | | | |
|   | 1 | 0 | 0 | 0 | 1 | 1 | 1 | 0 | 0 | 1 | 0 | 1 | 0 | 1 | 0 | 1 | 1 | 1 | 1 | 1 | 1 | 1 | 0 | 1 | 1 | 0 | 1 | 1 | 0 | 0 |
| 7 | RESERVED | | | | | | | | | SECONDARY DATA | | | | | | | TGD | | | | | | P ALIGN | | PARITY | | | | | |
|   | 1 | 0 | 0 | 0 | 1 | 1 | 1 | 0 | 0 | 1 | 0 | 1 | 0 | 1 | 0 | 1 | 1 | 1 | 1 | 1 | 1 | 1 | 0 | 1 | 1 | 0 | 1 | 1 | 0 | 0 |
| 8 | 8 LSB OF IODC | | | | | | | | SECONDARY DATA | | | | | | toc CLOCK CORRECTION | | | | | | | | P ALIGN | | PARITY | | | | | |
|   | 1 | 0 | 0 | 0 | 1 | 1 | 1 | 0 | 0 | 1 | 0 | 1 | 0 | 1 | 0 | 1 | 1 | 1 | 1 | 1 | 1 | 1 | 0 | 1 | 1 | 0 | 1 | 1 | 0 | 0 |
| 9 | af2 CLOCK CORRECTION | | | | | | | | af0 CLOCK CORRECTION | | | | | | af1 CLOCK CORRECTION | | | | | | | | P ALIGN | | PARITY | | | | | |
|   | 1 | 0 | 0 | 0 | 1 | 1 | 1 | 0 | 0 | 1 | 0 | 1 | 0 | 1 | 0 | 1 | 1 | 1 | 1 | 1 | 1 | 1 | 0 | 1 | 1 | 0 | 1 | 1 | 0 | 0 |
| 10 | af0 CLOCK CORRECTION | | | | | | | | | | SECONDARY DATA | | | | | | | | | | | | P | P | PARITY | | | | | |
|   |   |   |   |   |   |   |   |   |   |   | SECONDARY DATA | | | | | | | | | | | | P ALIGN | | PARITY | | | | | |
|   | 1 | 0 | 0 | 0 | 1 | 1 | 1 | 0 | 0 | 1 | 0 | 1 | 0 | 1 | 0 | 1 | 1 | 1 | 1 | 1 | 1 | 1 | 0 | 1 | 1 | 0 | 1 | 1 | 0 | 0 |

METHOD FOR DELIVERING SECONDARY (NON-LOCATION) DATA TO A GPS RECEIVER

RELATED PATENT APPLICATION

This application claims the benefit of U.S. Provisional Application Ser. No. 60/451,144 filed Feb. 28, 2003 and entitled "A Method for Delivering Secondary (Non-Location) Data to a GPS Receiver".

TECHNICAL FIELD OF THE INVENTION

This invention relates to the global positioning system (GPS), and more particularly to a method of providing non-location ("secondary") data to GPS receivers.

BACKGROUND OF THE INVENTION

GPS, which stands for Global Positioning System, is a geolocation system designed to determine the position of a receiver unit on the Earth anytime, in any weather, anywhere. GPS has 3 parts: the space segment, the user segment, and the control segment. The space segment consists of at least 24 satellites, each in its own orbit above the Earth. The user segment consists of small receivers. The control segment consists of ground stations (five of them, located around the world) that make sure the satellites are working properly.

The GPS satellites each take 12 hours to orbit the Earth. Each satellite is equipped with an accurate clock to let it broadcast signals coupled with a precise time message. A receiver receives the satellite signal, which travels at the speed of light. Even at this speed, the signal takes a measurable amount of time to reach the receiver. The difference between the time the signal is sent and the time it is received, multiplied by the speed of light, enables the receiver to calculate the distance to the satellite. To measure precise latitude, longitude, and altitude, the receiver measures the time it took for the signals from four separate satellites to get to the receiver.

GPS receivers can be hand carried or installed on aircraft, ships, tanks, submarines, cars, and trucks. Many different receiver models are in use. The typical hand-held receiver is about the size of a cellular telephone, and newer models are even smaller.

The GPS signals to a GPS receiver are fairly weak, and significant amounts of processing power are required to acquire and track them. When the receiver is indoors, the signals are considerably attenuated by structure such as walls and ceilings, and the signal strengths may easily drop below the receiver's sensitivity level. As a result, current GPS receivers do not work indoors and often fail or experience severe accuracy degradation in urban environments or under dense foliage.

Various approaches have been developed to increase the sensitivity of GPS receivers so that they may be used indoors. "Assisting data", such as techniques for weak signal detection, along with efficient correlation and synchronization algorithms, may be delivered to the receiver. One approach, used for cellular handsets that include a GPS receiver as well as the cellular signal receiver, is to pass assisting data from a cell site to the handset via the cellular system. The data is then passed to the GPS receiver. A second approach is the use of differential GPS (psuedolite system), which broadcasts correction data to GPS receivers. A third approach uses a wide area augmentation system (WAAS), specifically for aiding aircraft during landing. Each of these systems requires receiver hardware in addition to that used for acquiring and processing navigation data.

BRIEF DESCRIPTION OF THE DRAWINGS

FIG. 1 illustrates a system for communicating secondary data to a GPS receiver in accordance with the invention.

FIG. 2 is a block diagram of GPS receiver hardware.

FIG. 3 is a block diagram of the digital processing unit of FIG. 2.

FIG. 4 illustrates one subframe for secondary data in accordance with the invention.

DETAILED DESCRIPTION OF THE INVENTION

The following description is directed to a method of communicating "secondary data" to a GPS receiver. By "secondary data" is meant data not used for the conventional geolocation function of the GPS receiver. One example of secondary data is assisting data, which increases receiver sensitivity. Another example is command data, which controls the GPS processor for performing tasks other than geolocation.

FIG. 1 illustrates a system 10 for communicating secondary data to a GPS receiver 11 in accordance with the invention. In general, the method establishes a communications link to the GPS receiver 11 by exploiting the fundamental signaling characteristics of the GPS communication system. The secondary data is sent as the payload of a signal that uses a GPS spreading code. The GPS receiver 11 retains its full location capability.

The secondary data signal complies with certain restraints imposed by the GPS system, so as to insure that hardware modifications to the GPS receiver 11 are not necessary. The secondary data signal is acquired and demodulated in the same manner as a conventional GPS signal. Modifications for interpreting the secondary data are accomplished by manipulating the operating parameters and data processing capabilities of the GPS receiver 11 via its firmware or software. Thus, the GPS receiver 11 need not be increased in size or weight. The method further ensures that the target GPS receiver 11 receives and uses the message data while non target GPS receivers (not shown) do not. In effect, the secondary data signal is sufficiently like conventional GPS signals so as to not require hardware modification, but dissimilar enough to carry useful non-navigational data.

As explained below, the secondary data signal is identified by bounding the three dimensions over which a GPS receiver 11 searches to acquire and track its conventional GPS SPS (standard positioning service) ranging signal. The structure of the secondary data signal is similar to that of the GPS ranging signal. Thus, the signal is a DSSS waveform using a GPS C/A (coarse acquisition) code chipping sequence with a chipping rate of 1.023 MHz and a data rate of 50 Hz. The carrier frequency is within the frequency band that includes the GPS L1 carrier frequency (1575.42 MHz) and the expected Doppler effect.

A feature of the GPS system 10 is that all satellites 12 (also referred to herein as space vehicles) transmit on the same frequency, but are code division multiplexed. Thus, each satellite 12 is associated with a different spreading code. The GPS system 10 has allocated 32 spreading codes, 29 of which are currently in use for actual satellites. (There are five "potential replacement" satellites in addition to the required 24 of the GPS constellation). Thus, several codes are "unused". There are also five psuedolite spreading codes available for use. However, for purposes of example herein, it is assumed that there are 32 available spreading codes.

Each GPS receiver 11 is equipped to demodulate each of the available spreading codes. Secondary data signals are transmitted using one of the unused codes. In other embodiments, the GPS receiver 11 could be modified so as to be capable of also demodulating new spreading codes other than the existing codes.

FIG. 2 is a block diagram of the hardware of a GPS receiver 11. For purposes of this invention, a "GPS receiver" is one having the hardware of FIG. 2, dedicated to acquiring and interpreting GPS ranging signals.

The antenna 21 is either passive or active, with the latter incorporating a pre-amplifier. The signal from the antenna passes through a low noise amplifier (LNA) 22. The resulting signal passes through a filter 23 and is down converted to an intermediate frequency (IF) signal by mixing with a local oscillator (LO) 24. The signal then passes through an amplifier 25 and filter 26. A digitizer 27 samples the signal, converting it to a two-bit value that typically represents sign and magnitude. The digitized signal is passed to a processing unit 28 that acquires and tracks the GPS signal for demodulation and position and time processing.

FIG. 3 illustrates the digital processing hardware used to implement processing unit 28. For every tracking channel, the receiver 11 digitally performs a two-dimensional search over frequency and time. For every possible Doppler shift of the L1 carrier frequency, each receiver channel independently attempts to find a time offset that will align the channel's local replica of the C/A code with the C/A code of the assigned space vehicle. Aligning the local replica with the received C/A code permits the receiver to de-spread the signal. After locking the C/A code, the receiver locks to and tracks the carrier to maintain the alignment, allowing bit detection and message recovery.

More specifically, to begin a search, the receiver assigns a space vehicle's C/A code to a tracking channel. It synchronizes to the GPS ranging signal prior to demodulating the data. Synchronization is accomplished by locking to and tracking the code and carrier signals using two interrelated tracking loops, referred to as the code and the carrier tracking loops. The code and carrier tracking loops within one channel work together to acquire a C/A code, lock to the carrier phase, and track the code. Acquisition and tracking is a multi-step, iterative process in which the carrier tracking loop is first coarsely aligned with the space vehicle carrier frequency. This allows the code loop to coarsely align with the transmitted C/A code. Once coarse alignment is complete, carrier tracking is refined using phase information from the code loop.

After successfully synchronizing to the ranging signal, the receiver is able to distinguish bit transitions, determine subframe boundaries, and recover the message data. Once alignment is achieved, one of the correlators 36 provides a series of bits, to be interpreted by processing unit 38.

Referring again to FIG. 1, to communicate secondary data, the transmitter 13 produces a signal that simulates the GPS SPS ranging signal for a single space vehicle, by replicating a GPS C/A code sequence that modulates a carrier at or near the GPS L1 frequency. The signal contains a secondary data message instead of GPS navigation data. Transmitter 13 may be terrestrial, resulting in negligible Doppler shift in the RF carrier frequency. The actual frequency of the RF carrier can be selected to be anywhere within the range of Doppler shifts that the receiver 11 can accommodate. This is typically +/−4 KHz from the nominal 1575.42 MHz frequency. It is possible to characterize any error in the receiver's reference oscillator and compensate for it.

Receiver 11 acquires and tracks this signal, and the output of its tracking loop contains the narrow band secondary data bits in place of the navigation data bits. This method assumes the ability to modify a GPS receiver by obtaining low-level access to its firmware and by manipulating data and receiver operation beyond what is provided by standard GPS user interfaces. By "firmware" is meant the compiled executable software for the processor, programmed into memory. The firmware is modified such that it controls the function of the receiver hardware, typically contained in an ASIC.

If desired, an off the shelf GPS receiver can be modified to receive secondary data, without access to proprietary software. Although general information about GPS receivers is plentiful, details about the search algorithms and tracking loop implementations in specific GPS receivers may be difficult to obtain. For this reason, the method of the present invention may be performed iteratively, in that features can be implemented incrementally and tested in a laboratory environment.

The secondary data signal is a CDMA, direct sequence spread spectrum waveform with a chipping rate of 1.023 MHz and a data rate of 50 Hz. The carrier frequency is within the frequency band that includes the GPS L1 carrier frequency and Doppler offset. Transmitter 13 is capable of producing all GPS C/A codes, which are numbered 1–32. The GPS receiver generates C/A codes numbers 1–32 in a digital signal processing unit 28. Codes 12, 16, 19, and 32 are used because these are within the 32 codes allocated to GPS but are not assigned to an in-orbit space vehicle.

The search time of receiver 11 is limited by defining conditions for receiving a secondary data message. The receiver 11 navigates and determines a GPS position until a predetermined condition, such as a specific time or event, occurs. This condition prompts the receiver 11 to initiate a search for a predefined secondary data C/A code. This event also prompts the transmitter 13 to transmit a secondary data signal. The receiver 11 returns to normal navigational mode after receiving secondary data or after a time limit expires. The receiver's search is limited in the frequency domain to the GPS L1 frequency band with minimum Doppler shift, based on experimental results that are indicative of the algorithm used by the receiver to search for GPS space vehicles.

Thus, to receive the secondary data signal, processor 38 instructs the controls 31 and 32 for the tracking loops to look for the signal at a particular frequency at a particular time. It further instructs code generator 33 to look for a particular spreading code. Essentially, the receiver firmware is instructed to track a particular spreading code at a particular time and frequency. When the receiver's real time clock reaches this pre-programmed time, the receiver allocates tracking resources to locate the secondary data signal.

FIG. 4 illustrates a comparison of a subframe of a signal containing GPS navigational data to a subframe of signal containing secondary data. For words 3–10 in the subframe, two 30-bit structures are illustrated. The top data structure is the fields of a conventional GPS signal. The bottom data structure is that used for secondary data. An incoming signal may have either of these structures.

Both signals consist of three consecutive subframes, each having ten 30-bit words. Typical GPS software performs several validity checks before declaring subframe synchronization. Each 30-bit word contains six parity bits as its most significant bits. The parity algorithm links 30-bit words within and across subframes using a Hamming Code. Each subframe is constructed of 10 words, and certain data fields within words must be valid. The first word of each subframe is a preamble, which is a predefined bit sequence used by receiver 11 to identify the beginning of a subframe. The second word is a truncated GPS time-of-week (TOW) count and a subframe identification (SFID) code. A relationship exists between the TOW and SFID within a subframe, and consecutive subframes contain incrementing TOW and SFID values. The receiver 11 checks to ensure valid parity bits, valid encoding of the data, appropriate relationship between TOW and SFID within a subframe, and appropriate values between consecutive subframes. The receiver 11 also checks that the last two bits of a subframe are "00" so that the preamble sequence of the next subframe may be properly encoded.

The secondary data signal follows GPS constraints such that receiver 11 declares subframe synchronization and allows access to the demodulated 50 Hz data bits. The data fields that are not checked by receiver 11 are available for secondary data, leaving 176 bits for data in each subframe (22 bits in each of words 3–10).

Thus, in each subframe, the first two words are standard GPS words 1 and 2. These are necessary due to receiver constraints. The secondary data signal begins in the third word and is repeated in words 4 through 10.

Bits 23 and 24 of each word are used to adjust the six parity bits such that the final two bits in each word are zero, simplifying subsequent parity and data encoding. In other embodiments, these words may be used as part of the data field, increasing the data field length to 24 bits.

Subframe 1, word 3 contains a 6-bit data field for encoding the state of health status of the space vehicle transmitting the message. In the secondary data signal, this field may be populated with bit values that indicate to the receiver that the space vehicle data is invalid. This ensures that the target receiver and other receivers do not attempt to erroneously use the secondary data in a navigation solution. Non target receivers discard the demodulated data due to the status of the health bits.

Referring again to FIGS. 2 and 3, and as stated above, implementing receiver 11 by modifying a conventional GPS receiver without modifying GPS hardware requires a level of control over receiver operating parameters and software functions. By "operating parameters" is meant GPS receiver operating characteristics that are specified by a local system controller, typically via a serial interface. By "software functions" is meant GPS receiver operating characteristics that are only available through software modifications or special receiver modes. Control is required over the C/A code search algorithm, as well as access to the status of carrier and code tracking loops. The necessary status indications include C/A code acquisition, synchronization with the carrier, identification of bit transitions, and availability of decoded data bits. When decoded bits are available, access is required to the bits in software so that the secondary data message can be decoded and the receiver can react.

The highest level of receiver access is at the operator-definable parameters that are accessed via the receiver's GUI. The next level of access is source code for the firmware executing on the receiver's processor 28. Typically, source code is available for serial messaging, setting up tasks in the tasking-based operating system, and interfacing with proprietary software. The final level of access is software function calls to code that is provided only in object format. This code includes most aspects of obtaining a navigation solution. When a GPS receiver is to be modified without access to proprietary source code, these levels of access are sufficient for the modification.

Referring specifically to FIG. 3, the CDMA code search is limited by assigning the secondary data signal a specific C/A code and tasking the receiver to search for the secondary data C/A code. This involves controlling the code tracking loop and code generator implemented in the receiver 11. The secondary data signal uses a C/A code not in use by GPS space vehicles, but within the capability of the code generator 33. This code could be a psuedolite code (codes 33–37) or a code within the GPS code set (codes 1–32) that is not assigned to a space vehicle. Thus, the secondary data signal code is not necessarily one of the operational C/A codes for which non-target GPS receivers search.

Another aspect of modifying receiver 11 is control over indication of the status of the code and carrier tracking loops. Available function calls to source code provide a gateway into the code and carrier tracking loop activities. The source code also provides access to events that indicate milestones in the synchronization and tracking process. These two capabilities provide the state of the tracking loop, including the target C/A code for a tracking channel and the status of code, carrier, bit, and message synchronization.

Access is also required to demodulated data bits at the output of the correlators 36. The portion of the receiver 11 that demodulates the 50 Hz navigation data is typically contained in the proprietary portion of the receiver architecture. However, access to the demodulator may be experimentally gained.

The first step in accessing demodulated data bits is determining if the receiver is capable of finding the bit boundaries in the signal. To test this, a command consists of a C/A code that modulates the L1 carrier. A pattern of 1010 . . . data is imposed on the signal at a 50 bit per second rate. Testing this pattern with the receiver 11 reveals whether the receiver is able to acquire and track the C/A code, phase lock to the carrier, and determine the timing for bit transitions for the signal generated by transmitter 13. Numerous bit transitions may be necessary for receiver 11 to achieve bit synchronization. A reference signal for the signal generator may be required to stabilize the receiver state and allow it to lock with the C/A code, carrier, and bit transitions.

Once control over the code and carrier tracking loops and bit demodulation (functions accomplished in digital hardware) is established, access to the secondary (message) data is performed. When properly synchronized, the in-phase correlator output is the narrow band secondary data with the carrier and C/A code removed.

If secondary message data processing is accomplished on processing unit 28 with proprietary software routines, access to the data is possible via a function call to the object code containing the navigation message processing functions. The function call returns a data structure containing the 50 Hz demodulated data bits. The data is returned in a 10 word format, with each word containing 32 bits. The bits, at this point in processing, retain polarity ambiguity. This is similar to the navigation message subframe transmitted by GPS space vehicles. However, due to the power-of-two structure of modern general purpose computers, the received data words are stored in memory at 32 bit boundaries. The most significant two bits of the 32-bit word are the same as the least significant two bits of the previous 32-bit word. The two most significant bits of the 32-bit word is masked off and discarded to recover the 30-bit word.

The function call only returns the 50 Hz navigation message data under certain conditions. The data is only available when the receiver state is locked to a C/A code, is tracking the carrier, is synchronized with bit transitions, and is synchronized with the navigation message subframes. When these conditions are satisfied, the receiver activates an event indication that signals subframe synchronization and makes the demodulated navigation data bits available to higher level software routines. Because the means of accessing demodulated data bits from proprietary receiver code is via a 50 Hz function call, subframe synchronization is necessary. Thus, for purposes of providing a secondary data signal in accordance with the invention, a criteria beyond using a CDMA signal structure is to provide a message structure that allows receiver 11 to achieve subframe synchronization.

Interpretation of the secondary data is performed by processor 38. In the case of command data, the data could be instructions for when to attempt to acquire the next secondary data signal or instructions for controlling other devices. In the case of assisting data, the data may contain the current GPS time, the satellites that will be visible to the receiver when it attempts a position fix, the expected Doppler offset, the expected code offset, or other assisting data.

The invention claimed is:

1. A method of communicating secondary data to a GPS receiver having only GPS hardware, comprising the steps of:
   controlling the GPS receiver to search for a specified GPS frequency at a specified time, and with a GPS spreading code;
   transmitting a secondary data signal that conforms to frequency and data rate characteristics of a GPS signal;
   wherein the secondary data signal has subframes having the same format as a GPS navigation data signal except for a portion of the bits within a portion of the words of the subframe, said portion of the bits comprising the secondary data;
   receiving and demodulating the secondary data signal at the GPS receiver; and
   providing instructions to the processor of the GPS receiver for processing the secondary data.

2. The method of claim 1, wherein the first two words of the subframe are conventional GPS words.

3. The method of claim 1, wherein the portion of the words of the subframe is the third through the tenth word.

4. The method of claim 1, wherein the portion of the bits of the subframe is the first 22 bits.

5. The method of claim 1, wherein the secondary data represents assisting data for improving the sensitivity of the GPS receiver.

6. The method of claim 1, wherein the secondary data is command data for controlling processor tasks other than geolocation.

7. The method of claim 1, wherein the secondary data responds to the same processor function call as navigation data.

8. The method of claim 1, wherein the GPS receiver is a target receiver for receiving secondary data not used by non target GPS receivers.

9. The method of claim 1, wherein the spreading code is an unused spreading code.

10. The method of claim 1, wherein the receiving step is performed by searching in the GPS L1 frequency band with an expected Doppler shift.

11. An improved GPS receiver for receiving secondary data, using only GPS hardware including a GPS processing unit, the improvement comprising:
    a processing unit programmed to search for a signal having a specified GPS frequency at a specified time, and with a GPS spreading code;
    wherein the signal conforms to frequency and data rate characteristics of a GPS signal, but is a secondary data signal having subframes having the same subframe format as a GPS signal except for a portion of the bits within a portion of the words of the subframe, said portion of the bits comprising the secondary data; and
    the processing unit further programmed to lock to the spreading code, to track the carrier signal, to synchronize the subframe, and to access the data bits within the subframe.

12. The GPS receiver of claim 11, wherein the processor is further programmed to interpret the secondary data.

13. The GPS receiver of claim 11, wherein the processing unit uses the same function calls for secondary data as for GPS navigation data.

14. The GPS receiver of claim 11, wherein the GPS receiver is a target receiver for receiving secondary data not used by non target GPS receivers.

15. A method of modifying a GPS receiver having a processing unit so that the GPS receiver may receive secondary message data, comprising the steps of:
    programming the processing unit to search for a signal having a specified GPS frequency at a specified time, and with a GPS spreading code;
    wherein the signal conforms to frequency and data rate characteristics of a GPS signal, but is a secondary data signal having subframes having the same subframe format as a GPS signal except for a portion of the bits within a portion of the words of the subframe, said portion of the bits comprising the secondary data;
    further programming the processing unit to lock to the spreading code, to track the carrier signal, to synchronize the subframe, and to access the secondary data bits within the subframe.

16. The method of claim 15, wherein the step of programming the processing unit to search is performed by modifying a code search algorithm.

17. The method of claim 15, wherein the step of programming the processing unit to lock to the spreading code is performed by accessing a code tracking loop.

18. The method of claim 15, wherein the step of programming the processing unit to track the carrier signal is performed by accessing a carrier tracking loop.

19. The method of claim 15, wherein the step of programming the processing unit to synchronize with the subframe is performed by accessing synchronization status indicators.

20. The method of claim 15, wherein the step of programming the processing unit to access the secondary data bits is performed by accessing software function calls.

* * * * *